May 6, 1930.                    J. W. JONES                    1,757,430
                        AUTOMATIC FUEL SHUT-OFF VALVE
                              Filed April 9, 1928
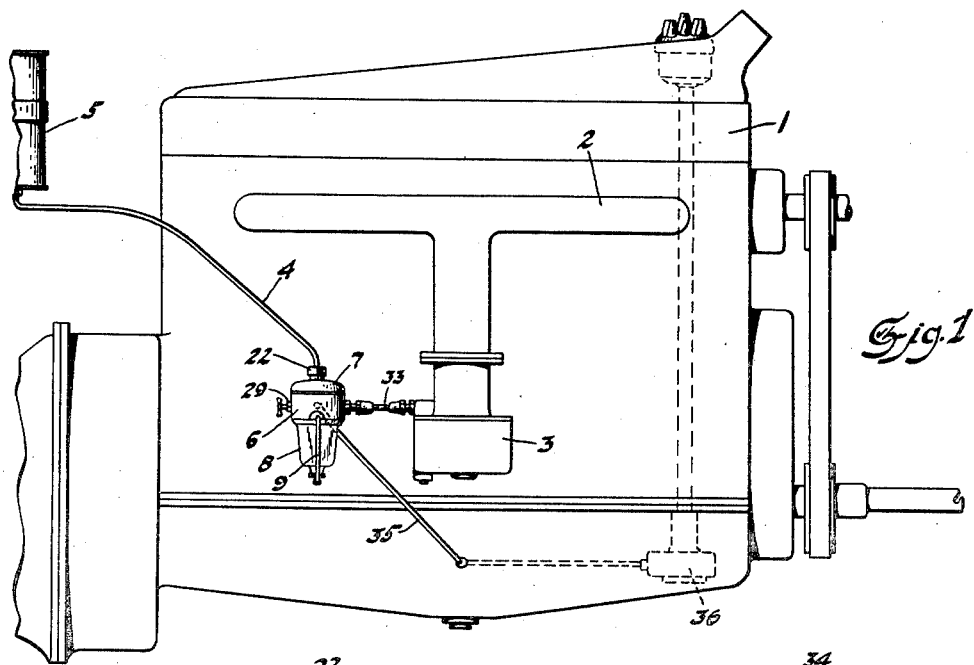
Fig. 1
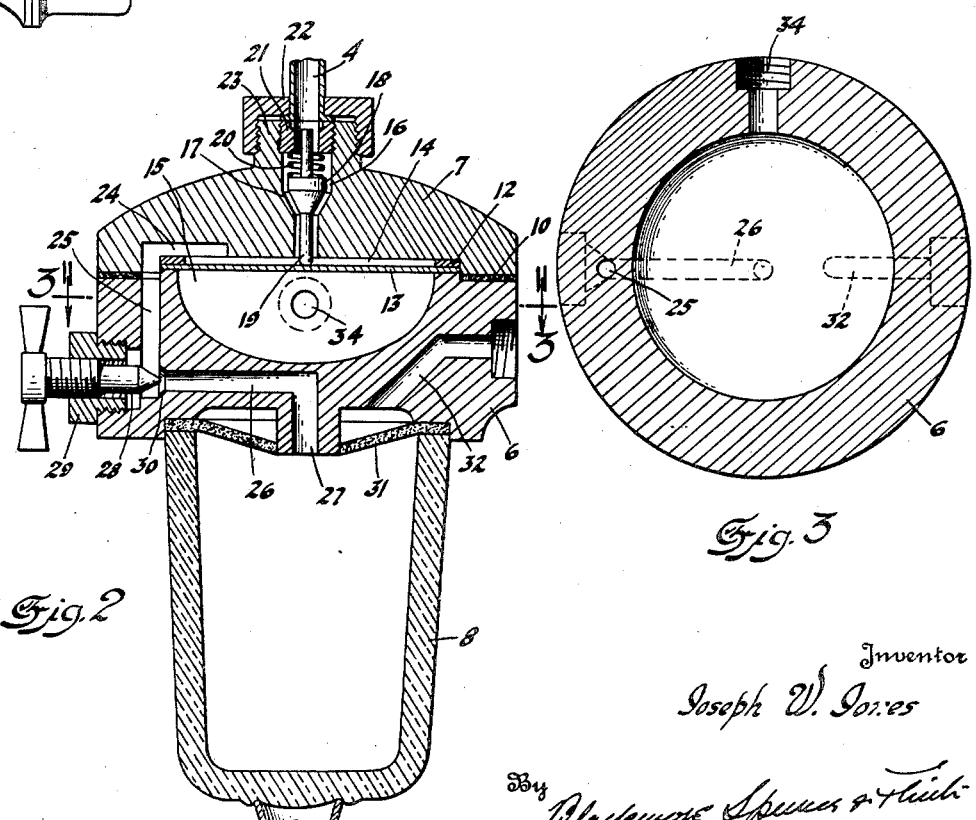
Fig. 2                                                    Fig. 3
Inventor
Joseph W. Jones
By Blackmore, Spencer & Flint
                                    Attorney Patented May 6, 1930

1,757,430

UNITED STATES PATENT OFFICE

JOSEPH W. JONES, OF FLINT, MICHIGAN, ASSIGNOR TO GENERAL MOTORS CORPORATION, OF DETROIT, MICHIGAN, A CORPORATION OF DELAWARE

AUTOMATIC FUEL SHUT-OFF VALVE

Application filed April 9, 1928. Serial No. 268,668.

This invention relates to internal combustion engines for motor vehicles and more particularly to an improvement in fuel supply systems.

The invention contemplates the insertion in the fuel line leading to the carburetor of a strainer or filter for removing dirt or other foreign material from the fuel, with which is associated a valve governing the fuel supply and operating automatically in accordance with the condition of the engine lubricating system.

It is one of the objects of the invention to provide an automatically operated valve to shut off the supply of fuel upon failure of the lubricating system to function properly. In the event the car owner fails to replenish his oil supply from time to time and allows the supply to run low or should the oil lines become clogged or leaky there is presented the grave danger of very harmful and costly damage to the bearings resulting through their lack of lubrication. The present device is designed to automatically stop the flow of fuel when the oil pressure falls low whereby the engine will cease to operate for lack of fuel until the conditions in the lubricating system are remedied thereby preventing burned out bearings and other serious injury to the operating parts of the engine.

Other objects and advantages will be apparent from the following specification taken in connection with the accompanying drawing, wherein,—

Fig. 1 is a somewhat diagrammatic side elevation of an internal combustion engine having applied thereto the present invention.

Fig. 2 is a vertical sectional view of the strainer and the associated cut-off valve for the fuel supply, and Fig. 3 is a transverse sectional view taken on line 3—3 of Fig. 2.

Referring to the drawing the numeral 1 indicates an internal combustion engine having an intake manifold 2 and a carburetor 3. Liquid fuel, such as gasoline, is supplied to the carburetor through a conduit or pipe 4 leading from the storage tank or reservoir 5. The device forming the present subject matter includes a head 6 and a removable cap 7, which, for convenience and economy in manufacture are preferably die castings, and a bowl or receptacle 8 preferably of glass detachably secured on the under side of the head 6 as by means of a swinging bail 9. A sealing gasket 10 is interposed between the head and cap as is also a ring 12 and a flexible wall or diaphragm 13 separating an annular recess 14 on the under side of the cap, and a cavity 15 in the top of the head. A central bore or passageway 16 in the cap has a tapered shoulder 17 forming a seat for the conical valve element 18 having a dependent stem 19 bearing against the diaphragm. A tension spring 20 bears at one end against the valve head and at the other end against an apertured retainer 21 screw-threaded into the bore 16, and a fitting 22 having screw-threaded engagement with a boss 23 on the cap serves to connect the fuel line 4 with the passageway or bore 16. When the valve is opened the gasoline or other liquid fuel flows from the line 4 through the bore 16 into the recess 14 above the diaphragm through an opening 24 in the cap and a bore or passageway 25 in the head, thence through a lateral bore 26 and vertical passageway 27 into the bowl 8. The amount of fuel allowed to flow through the inlet to the bowl is controlled by a manually operated needle valve 28 having a shank adjustably screw-threaded in the fitting 29 which, in turn, is screw-threaded into the head. Adjustment of the valve 28 to move it tightly against its seat 30 completely shuts off the flow of fuel to permit the bowl to be removed for cleaning the dirt and sediment deposited therein and which is separated from the fuel as the fuel passes up through a screen or filter element 31 and an outlet passageway 32 connected by the line 33 with the carburetor. The chamber formed by the cavity and diaphragm has a lateral opening 34 by means of which the pressure line 35 leading from the oil pump 36 in the engine crankcase is brought into communication therewith.

As will be readily understood, the pump 36 is a part of the conventional lubricating system that supplies the several bearings with oil under pressure. So long as the pump is operating effectively and supplying oil in sufficient quantity and under proper pressure, the pressure in the line 35 and chamber formed by the cavity 15 will hold the diaphragm extended in the position shown in Figure 2, wherein the valve 18 is lifted off its seat against the tension of the spring 20 to allow the fuel to reach the carburetor through the strainer. However, when the oil pressure drops to a point involving possible danger to the engine bearings, it will no longer resist the tension of the spring, whereby the valve will be moved toward its seat to shut off the flow of fuel. The car owner is thus apprised of the condition of his lubricating system by the slowing down of the engine, and he will therefore be able to replenish the oil supply or otherwise correct the fault before serious injury results.

It will be understood that the fuel flow is not suddenly nor completely shut off, but that the valve moves gradually toward its seat with the decrease in pressure in the lubricating system. Even though the pressure fails entirely, sufficient fuel will leak past the valve to allow the vehicle to proceed slowly until the oil supply can be replenished.

While the device has been described more or less specifically, it will be understood that the invention is not limited to the exact details shown, and that such modifications may be made as come within the scope of the appended claims.

I claim:

1. In combination, a head member having inlet and outlet passages, a dirt receptacle removably secured on the underside of said head, a filter element in said receptacle interposed between the inlet and outlet passages, a cap member removably secured on the upper side of said head, having a passageway therein communicating with and forming a part of said inlet passage, a flexible diaphragm held between the head and cap and co-operating with a cavity in the head to form a pressure chamber, a lubricating pressure system communicating with said chamber, a valve element controlling the flow of liquid through the inlet passage, having a portion bearing on said diaphragm, and spring means adapted to urge the valve to closed position, the pressure in said lubricating system being adapted to flex said diaphragm and oppose the tension of said spring means to open the valve.

2. In an internal combustion engine, the combination with a fuel supply system and a pressure lubricating system, of a head member having inlet and outlet passages therein, forming a part of the fuel supply system, a dirt receptacle carried by said head having communication with the inlet and outlet passages, a strainer element in said receptacle interposed between the inlet and outlet passages, a cap member on said head having a passageway therein communicating with and forming a part of the inlet passage, a valve element in said passageway, having a dependent stem, spring means to yieldingly hold the valve closed, a chamber in said head associated with the pressure lubricating system, a flexible wall for said chamber engageable with said valve stem to open the valve against the tension of said spring means, when the wall is flexed by pressure in said lubricating system.

3. In an internal combustion engine, the combination with a fuel supply system and a pressure lubricating system, of a head member having inlet and outlet passages therein, forming a part of the fuel supply system, a dirt receptacle carried by said head having communication with the inlet and outlet passages, a strainer element in said receptacle interposed between the inlet and outlet passages, a pressure chamber in said head having communication with the lubricating system, a flexible diaphragm in said chamber, flexible upon variations in the pressure therein, and a valve element associated with one of the passages in said head and operatively connected with said diaphragm to automatically control the flow of fuel through the fuel system in accordance with the pressure in the lubricating system.

4. In an internal combustion engine, the combination with a fuel supply system and a pressure lubricating system, of a head member having inlet and outlet passages therein, forming a part of the fuel supply system, a dirt receptacle carried by said head having communication with the inlet and outlet passages, a strainer element in said receptacle interposed between the inlet and outlet passages, a pressure chamber in said head communicating with the lubricating system, a wall for the chamber movable under influence of the pressure in said chamber, a valve in one of the passages in said head operatively connected with said wall to automatically control fuel feed through the passage in accordance with the pressure in said lubricating system.

5. In combination, a head having a fuel passageway therethrough, a cap removably secured to said head, having a passageway communicating with and forming a part of said fuel passageway, a flexible diaphragm held between the cap and head over a cavity in the head, a lubricant pressure line communicating with said cavity, a valve element in the passageway through said cap operatively associated with said diaphragm, whereby the flexing of the diaphragm under pressure of the lubricant in the cavity controls the opening and closing of said valve element.

6. In combination, a head having a fuel passageway and a cavity therein, a cap secured on said head having a passageway communicating with the passageway in the head, a flexible diaphragm interposed between the head and cap and closing said cavity, a valve element in the passageway in the cap having a stem adapted to bear on said diaphragm, spring means yieldingly holding the valve on its seat, and a pressure line in communication with said closed cavity to introduce fluid under pressure therein to flex said diaphragm and move the valve to open position against the tension of said spring means.

In testimony whereof I affix my signature.

JOSEPH W. JONES.